W. N. BARRETT.
SNUBBER.
APPLICATION FILED MAY 18, 1916.

1,228,515.

Patented June 5, 1917.

Inventor
William N. Barrett
By
Attorney

# UNITED STATES PATENT OFFICE.

WILLIAM N. BARRETT, OF MEADVILLE, PENNSYLVANIA.

SNUBBER.

1,228,515.

Specification of Letters Patent.

Patented June 5, 1917.

Application filed May 18, 1916. Serial No. 98,282.

*To all whom it may concern:*

Be it known that I, WILLIAM NOBLE BARRETT, a citizen of the United States, residing at Meadville, in the county of Crawford and State of Pennsylvania, have invented new and useful Improvements in Snubbers, of which the following is a specification.

This invention relates to snubbers and consists in certain improvements in the construction thereof as will be hereinafter fully described and pointed out in the claims.

The object of the invention is to prevent a too rapid re-bound from the spring compression in automobiles and the general purpose of the invention is well understood.

The invention is illustrated in the accompanying drawings as follows:—

Figure 1:
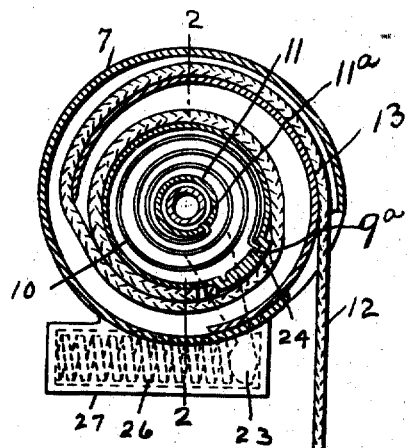
Figure 1 is a section on the line 1—1 in Fig. 2.
Figure 2:
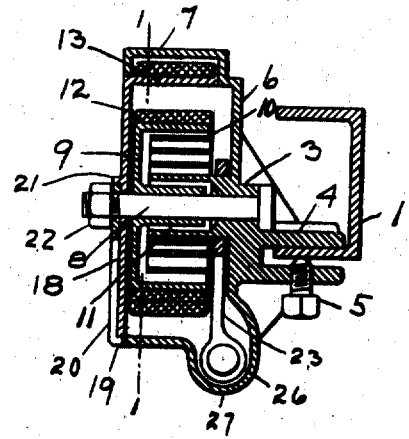
Fig. 2 is a section on the line 2—2 in Fig. 1.
Figure 3:
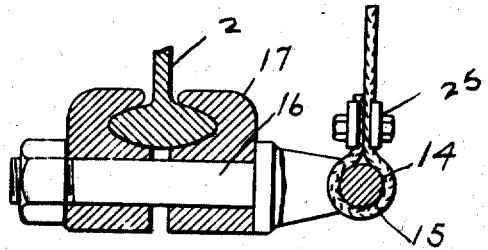
Fig. 3 is a side elevation of one member of the snubber.
Figure 3:
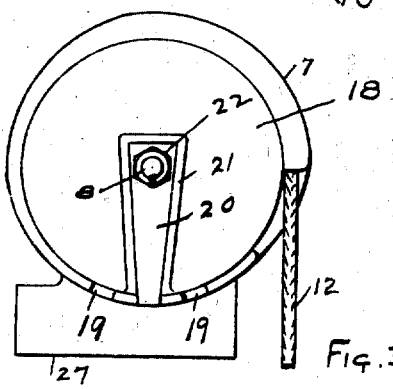
Figure 4:
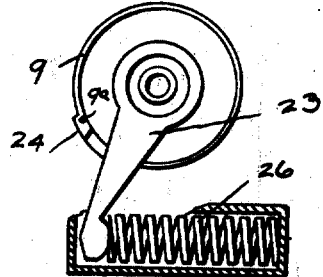
Fig. 4 is a view of the buffer spring and immediately actuating parts.

1 marks a rail of an automobile and 2 the axle. The operative member of the snubber has the frame 3 from which extends a clamp bracket 4. One jaw of the clamp bracket is adapted to engage a portion of the automobile rail and it is clamped thereon by means of a set screw 5.

A plate 6 extends outwardly from the frame 3 and a flange 7 extends outwardly from the plate 6, the flange being approximately circular in shape and having an inwardly extending portion along the outer edge, thus forming a housing for the snubber strap hereinafter described.

A pin 8 extends through the frame 3. A spring wheel 9 is journaled on the pin 8. A spring 10 is mounted on an extension 11 extending from the frame 3, the extension having a slot 11ª by means of which the spring is anchored. The outer end of the spring has a hooked end which extends into notches 9ª in the interior surface of the wheel 9. There are preferably several of these notches so that different adjustments of the spring may be made.

A strap 12 extends over the friction surface 13 and its free end is secured to a bolt 14 carried by the clamping bolt 16. The clamping bolt 16 extends through the clamping member 17 by means of which the free end of the strap is secured to the axle 2 of the car.

The friction surface 13 is carried by a plate 18 and its surface is curved preferably approximately concentric with the pin 8. The inner end of the strap 12 is secured to the spring wheel 9.

It will be readily seen that as the members of the snubbing device are brought closer together by the compression of a spring on an automobile so that the free end of the strap is loosened the spring acting on the wheel 9 will wind up the strap thus taking up the slack as the free end is relieved. When, however, the parts tend to separate the strap is drawn over the friction surface 13 and inasmuch as the slack on the strap is taken up by the spring wheel this friction resists the separation of the parts and thus gives the snubbing action as desired.

Different weights of cars and different springs require different resistance and to make the device adjustable for this purpose, I have arranged to make the plate 18 which carries the flange 13 adjustable. Notches 19 are arranged in the flange 7. A pawl 20 is placed between the shoulders 21 on the face of the plate 18. The pawl is secured in position by the nut 22 on the end of the pin 8. The end of the pawl extends into the notches 19. By rotating the plate and bringing the pawl 20 into different notches the length of the friction surface 13 which is engaged by the strap 12 may be varied.

When the members have separated to such an extent that the springing of the car has returned to its neutral position it is desirable to prevent over-running beyond this position and, therefore, desirable to augment the frictional resistance given to the separation by the strap. This is accomplished in the present invention as follows:

A lever 23 is pivoted on the extension 11. A projection 24 is arranged on the inner edge of the wheel 9 and is adapted to engage the lever 23 when the wheel 9 has been rotated by the outwardly moving strap to a position where the axle and snubbing device are separated to the normal extent. The point at which the projection 24 picks up the lever may be varied by varying the length of the strap 12 and the clamp 25 is provided so that this adjustment may be made.

The end of the lever 23 engages a spring 26, the spring being arranged in the pocket 27 extending from the frame 3.

When the parts have separated to the normal extent the projection 24 will engage the lever 23 and force the lever 23 to rock or turn with the spring wheel 9 thus compressing the spring 26. Not only the spring action will be added to the resistance offered by the friction device but inasmuch as the spring 26 resists the turning of the wheel 9 it will draw the strap into closer engagement with the friction surface 13 so as to increase the frictional resistance. In this way the over-running of the device or springs of the vehicle are very largely prevented.

I have shown a braided strap. Any form of strap of leather or other material may be used.

What I claim as new is:—

1. In a snubber, the combination of the members forming a means of attachment to an axle and a car body; a curved friction surface carried by one of the members; a friction strap operating over said surface and having one end secured to the opposite member; and a rotatively mounted spring device arranged within the curve of the friction surface operating upon the opposite end of the strap, and increasing the braking action of the strap as the members separate.

2. In a snubber, the combination of the members forming a means of attachment to an axle and a car body; a curved friction surface carried by one of the members; a friction strap operating over said surface and having one end secured to the opposite member; a wheel rotatively mounted within the curve of the friction surface to which the opposite end of the strap is secured; and a spring resisting the movement of the wheel.

3. In a snubber, the combination of the members forming a means of attachment to an axle and a car body; a cover plate rotatively mounted; a curved friction surface carried by the cover plate; a friction strap operating over the surface and having one end secured to the opposite member; a spring operating on the opposite end of the strap; and means for rotatively adjusting the cover plate to vary the length of friction surface engaged.

4. In a snubber, the combination of the members forming a means of attachment to an axle and a car body; a friction surface carried by one of the members; a friction strap operating over said surface and having one end secured to the opposite member; a resisting device operating on the opposite end of the strap and inducing frictional engagement between the strap and friction surface; and an auxiliary resisting device adapted to augment the frictional engagement between the strap and friction surface at a point in the movement of the strap.

5. In a snubber, the combination of the members forming a means of attachment to an axle and a car body; a friction surface carried by one of the members; a friction strap operating over said surface and having one end secured to the opposite member; a spring operating on the opposite end of the strap; a buffer spring; and means for locking the strap with the buffer spring at a point in the movement of the strap.

6. In a snubber, the combination of the members forming a means of attachment to an axle and a car body; a friction surface carried by one of the members; a friction strap operating over said surface and having one end secured to the opposite member; a rotatively mounted spring device operating on the opposite end of the strap; a buffer spring; and means for locking the strap with the buffer spring at a point in the movement of the strap.

7. In a snubber, the combination of the members forming a means of attachment to an axle and a car body; a friction surface carried by one of the members; a friction strap operating over said surface and having one end secured to the opposite member; a rotatively mounted spring device operating on the opposite end of the strap; a lever actuated by said device after a predetermined movement of said device; and a buffer spring actuated by the lever.

8. In a snubber, the combination of the members forming a means of attachment to an axle and a car body; a friction surface carried by one of the members; a friction strap operating over said surface and having one end secured to the opposite member; a rotatively mounted spring device operating on the opposite end of the strap; a lever actuated by said device after a predetermined movement of said device; a buffer spring actuated by the lever; and means for adjusting the length of the strap.

9. In a snubber, the combination of the members forming a means of attachment to an axle and a car body, one of the members comprising a frame with a centrally located extension; an outwardly extending plate with an over-hanging flange; a pin arranged in said member; a wheel rotatively mounted on the pin; a cover plate having a friction surface extending therefrom; a detent locking device between the over-hanging flange and the cover plate; a spring wheel mounted on the pin; a spring actuating the wheel; a friction strap mounted on the wheel and extending over the friction surface; a buffer spring carried by the frame; a lever mounted on said extension and engaging said spring; and means on the spring wheel for engaging the lever.

In testimony whereof I have hereunto set my hand.

WILLIAM N. BARRETT.